United States Patent
Markels, Jr.

(10) Patent No.: US 6,200,530 B1
(45) Date of Patent: Mar. 13, 2001

(54) METHOD OF SEQUESTERING CARBON DIOXIDE WITH SPIRAL FERTILIZATION

(76) Inventor: Michael Markels, Jr., P.O. Box 1549, Springfield, VA (US) 22151

(*) Notice: Subject to any disclaimer, the term of this patent is extended or adjusted under 35 U.S.C. 154(b) by 0 days.

(21) Appl. No.: 09/521,895

(22) Filed: Mar. 9, 2000

(51) Int. Cl.[7] .................................................. A01G 31/00
(52) U.S. Cl. .............................. 422/40; 119/200; 47/59; 47/1.4
(58) Field of Search ......................... 422/4, 40; 119/200; 47/59, 1.4

(56) References Cited

U.S. PATENT DOCUMENTS

| | | | |
|---|---|---|---|
| 5,433,173 | * | 7/1995 | Markels, Jr. . |
| 5,535,701 | * | 7/1996 | Markels, Jr. . |
| 5,967,087 | * | 10/1999 | Markels, Jr. . |
| 5,992,089 | * | 11/1999 | Jones et al. . |
| 6,056,919 | * | 5/2000 | Markels, Jr. . |

OTHER PUBLICATIONS

"Predominance of vertical loss of carbon from surface waters of the equatorial Pacific Ocean", Dennis A. Hansell, Nicholas R. Bates and Craig A. Carlson, *Nature*. vol. 336, pp 59–61 (Mar. 6, 1997).*

"Phytoplankton Bloom on Iron Rations", Bruce W. Frost, *Nature*, vol. 383, pp. 475–476 (Oct. 10, 1996).*

"Confirmation of Iron Limitation of Phytoplankton Photosynthesis in the Equatorial Pacific Ocean", Michael J. Behrenfeld et al, *Nature*, vol. 383, pp. 508–511 (Oct. 10, 1996).*

"Large Decrease in Ocean–Surface $CO_2$ Fugacity in Response to In–situ Iron Fertilization", D.J. Cooper et al, *Nature*, vol. 383, pp. 511–513 (Oct. 10, 1996).*

"A Massive Phytoplankton Bloom Induced by an Ecosystem–scale Iron Fertilization Experiment in the Equatorial Pacific", Kenneth H. Coale et al, *Nature*, vol. 383, pp. 495–501 (Oct. 10, 1996).*

"Oceanographers' Green Thumb", *Science*, vol. 269, p. 759 (Aug. 11, 1995).*

* cited by examiner

*Primary Examiner*—Elizabeth McKane
(74) *Attorney, Agent, or Firm*—Bacon & Thomas, PLLC

(57) ABSTRACT

A method of sequestering carbon dioxide ($CO_2$) in an ocean comprises testing an area of the surface of a deep open ocean in order to determine both the nutrients that are missing and the diffusion coefficient, applying to the area in a spiral pattern a first fertilizer that comprises a missing nutrient, and measuring the amount of carbon dioxide that has been sequestered. The application of the first fertilizer in a spiral pattern results in a patch of fertilizer where the concentration of the fertilizer does not vary by more than about 50% within two days of the local application. The concentration of the fertilizer at the center of the patch does not decrease through diffusion by more than about 5% during a time period of about 20 days after the application of the patch of fertilizer. The method may further comprise applying additional fertilizers, and reporting the amount of carbon dioxide sequestered. The method preferably includes applying a fertilizer in pulses. Each fertilizer releases each nutrient over time in the photic zone and in a form that does not precipitate.

20 Claims, 1 Drawing Sheet

METHOD OF SEQUESTERING CARBON DIOXIDE WITH SPIRAL FERTILIZATION

BACKGROUND OF THE INVENTION

The field of the invention is controlling the amount of carbon dioxide ($CO_2$) in the atmosphere. This may have a significant effect on global climate change, including global warming.

The carbon dioxide content of the atmosphere has been increasing. This is based on measurements over the last 40 years or more. There is concern that this increase may result in global climate change, which over time may have an adverse effect on weather, sea level and human survival.

This concern has lead to the 1992 Rio Treaty and the Kyoto Protocol of 1997. These call for significant decrease in the amount of carbon dioxide released to the atmosphere from the burning of fossil fuels by the industrial world. If these reductions are put into effect, then serious adverse consequences are expected. The economy of the industrialized world could be significantly, adversely affected. This could result in a loss of jobs, decreases in the standard of living, reduction in life span and possible political unrest. Moreover, this would not be a solution because it does not permit or require a reversal of the currently increasing levels of carbon dioxide in the atmosphere.

Carbon dioxide is released into the atmosphere both by the burning of fossil fuels, and by the recycling of plant materials. Carbon dioxide is removed from the atmosphere by the photosynthesis of plants on land and in the oceans. This removal of carbon dioxide from the atmosphere may be referred to as a carbon dioxide sink. It is the net flow (releases minus sinks) that has caused the increase in atmospheric carbon dioxide level which is of present concern. Without human intervention, the net flow of carbon dioxide into and out of the atmosphere is roughly zero, with the sources and sinks in rough balance. When fossil fuels are burned, only about 60 percent of the released carbon dioxide is subsequently taken out of the atmosphere by natural sinks. The remaining about 40 percent increases the carbon dioxide level of the atmosphere, leading to concern over climate changes.

The net carbon dioxide released into the atmosphere can be reduced, but not eliminated, by increasing the efficiency of power-producing equipment and by harnessing wind and solar power. Generally speaking, these approaches are costly and may be reaching their practical limits. We have been increasing the efficiency of heat engines for over 200 years, and may be approaching the limits of basic thermodynamics. It is very costly to harness low intensity power sources such as wind, waves, sunlight and ocean thermal gradients, especially where energy requirements are large. Moreover, these approaches can only reduce the increase in carbon dioxide concentration, never eliminate the increase. Therefore, these approaches cannot adequately address the concern over the increasing carbon dioxide content of the atmosphere.

The technology of carbon dioxide sink enhancement is in its infancy. The sequestering of carbon dioxide in geological formations is both beneficial and inexpensive, if the carbon dioxide is relatively concentrated. An example of relatively concentrated carbon dioxide is the off-gas after removal of methane from natural gas containing carbon dioxide. However, there is relatively little carbon dioxide available in such concentrated form. Most carbon dioxide is available in concentrations of from about 10 percent to about 25 percent in exhaust gases from the combustion of fossil fuels. It is quite expensive to increase the concentration of carbon dioxide from about 10 or 25 percent to about 100 percent. The preferable course of action appears to be the use of sunlight and plants to do the concentrating, and subsequently to sequester the resulting plant material in some manner.

One approach would be to plant trees. However, there is not enough land to plant sufficient trees to zero out the net carbon dioxide production. Even if there were enough land, we would have to find a place to store the resulting wood after about 50 to about 100 years, such that the wood would not rot and release carbon dioxide to the atmosphere. Thus, this approach would not sequester carbon dioxide for a relatively long period of time.

The best place to enhance plant growth is in the oceans. Ninety-eight percent of the surface of the ocean is a barren desert with almost no plant life. About sixty percent of the plant life (phytoplankton) in the oceans of the world arises from about only two percent of the surface of the oceans. A reduction in the net flow of carbon dioxide may be achieved, if some of that ninety-eight percent of the surface of the ocean is made as productive as that two percent.

SUMMARY OF THE INVENTION

A method of sequestering carbon dioxide comprises the following steps: testing an area of the surface of an ocean for suitability; fertilizing a suitable area of the surface of the ocean to increase plant life and sequester carbon dioxide; and measuring the amount of carbon dioxide that has been sequestered. The testing includes a determination of the diffusion coefficient in the surface of the ocean so that an optimum pattern of fertilization can be designed. The fertilizing preferably includes a ship dispersing liquid fertilizer in a spiral pattern which starts at the center of the spiral that is marked by a buoy that floats with the current. The method may include the additional step of reporting the amount of carbon dioxide that has been sequestered. An area of the surface of an ocean is suitable if both at least one nutrient is missing to a significant extent, and the water is deep. A nutrient is missing to a significant extent, if the metabolism of carbon dioxide is reduced to a significant extent by the level of the nutrient in the water. An appropriate amount of a missing nutrient is an amount to raise the concentration of the nutrient at the ocean surface so that the metabolism of carbon dioxide is no longer reduced to a significant extent by the concentration of the nutrient. The depth of the water is preferable at least about 5,000 feet (about 1524 meters), more preferably at least about 10,000 feet (about 3048 meters), and most preferably at least about 15,000 feet (about 4572 meters). The fertilizing creates a new verdant zone, preferably in the ocean surface above very deep water. The testing and reporting may be carried out by any of a number of methods that are known to one of ordinary skill in the art. The reporting may be carried out in a number of forms. Conventional forms would include printing the report on paper or another substrate, or storing the report in magnetic media or optical media. The report may be in a form required by a governmental authority. Such governmental authority may monitor the amount of carbon dioxide that is released into the atmosphere by a particular person or company. The amount of carbon dioxide released may be a debit on the balance sheet of such person or company. The governmental authority may allow credits on such balance sheet for the amount of carbon dioxide stated in such report as being sequestered.

DETAILED DESCRIPTION OF THE INVENTION

Figure 1:
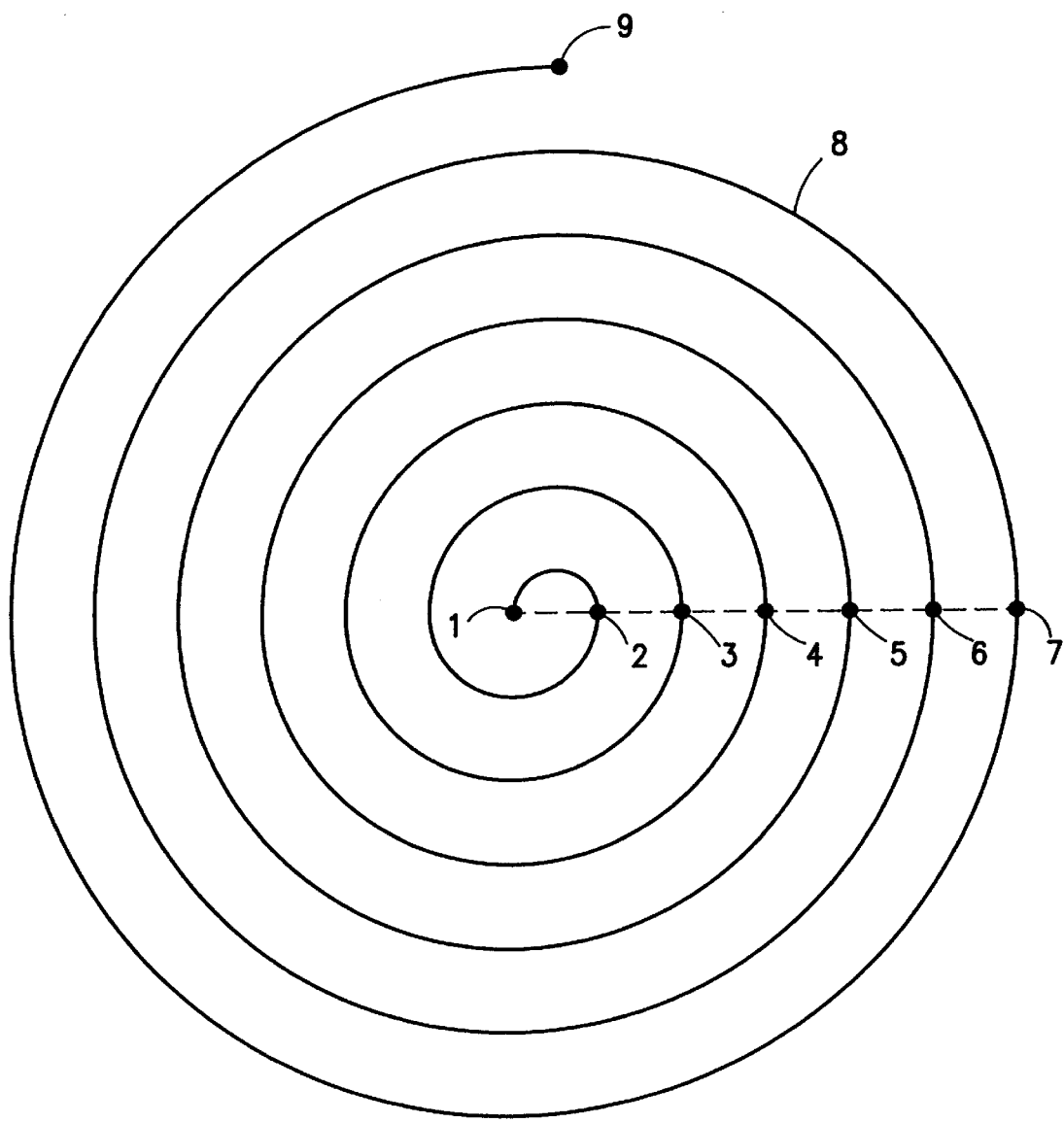
FIG. 1 is a schematic illustration of a spiral pattern of fertilization according to the invention.

The testing of an area of the surface of an ocean for suitability for the present method preferably includes a determination of the diffusion coefficient for the surface of the water. This allows for an estimate to be made of the mixing of the fertilizer that will take place over a fixed period of time after the application of the fertilizer. In order to make this estimate, one also needs to know the composition of the fertilizer. In a preferred embodiment, the diffusion coefficient is measured using the same liquid or pelletized fertilizer that will be applied to the surface of the ocean.

The fertilizing of a suitable area of the surface of the ocean to increase plant life and sequester carbon dioxide, preferably includes the application of a pelletized, liquid or powdered fertilizer in a spiral pattern to create a patch of fertilizer. Preferably, the size of the patch of fertilizer is such that the center of the patch is not disturbed by the edges of the patch for at least about twenty days after the fertilizer is applied. In a preferred embodiment, the concentration of the fertilizer in the center of the patch does not decrease through diffusion by more than about 5% during a time period of about twenty days after the patch is applied, which may define the minimum size of the patch of fertilizer.

The size of the patch of fertilizer is also affected by other factors. The vessel that applies the fertilizer may be a ship that is capable of a speed of about 15 to about 18 knots. Multiple vessels may be used. In a preferred embodiment, a single ship applies the patch of fertilizer over a time period of from about 3 to about 4 days. The maximum size of the patch may be affected by the top speed of the vessel, the maximum rate at which the vessel can distribute the fertilizer, and the concentration of the nutrients in the fertilizer. Preferably, a liquid fertilizer is used which may allow the rate at which the fertilizer is pumped into the ocean to be more precisely controlled in relation to the speed of the vessel.

FIG. 1 shows a schematic view of a preferred pattern of application of the fertilizer. The center 1 of the spiral may be defined by the placement of a floating buoy. The buoy may be carried by the current. Thus, the latitude and longitude of the center of the spiral may vary as the fertilizer is applied. The vessel may begin applying the fertilizer at the center 1 of the spiral, and continue application of the fertilizer in the spiral pattern as shown by line 8 which ends at point 9. The fertilizer is applied such that the concentration of the fertilizer in the surface of the ocean does not vary by more than about 50% between the arms of the spiral within from about one to about two days after the fertilizer is applied. A radius is shown in broken line connecting the center 1 with points 2, 3, 4, 5, 6 and 7 on line 8. The concentration of the fertilizer may be at a maximum at points 1, 2, 3, 4, 5, 6 and 7. The concentration of the fertilizer may be at a minimum at the points along the radius which are equidistant from points 1 and 2, equidistant from points 2 and 3, equidistant from points 3 and 4, equidistant from points 4 and 5, equidistant from points 5 and 6, and equidistant from points 6 and 7. In a preferred embodiment, the concentration at each of these equidistant points is no less than about 50% of the concentration of each of points 1, 2, 3, 4, 5, 6 and 7. Within a time period of from about 1 to about 2 days after completion of the application of the patch of fertilizer, the concentration of the fertilizer over the entire surface of the patch may be from about 50% to about 60% of the maximum concentration of the fertilizer at any point in the patch due to the mixing of the fertilizer in the surface of the ocean.

The spiral application of the fertilizer preferably results in a continuous bloom of phytoplankton across the entire surface of the patch of fertilizer, and does not result in dots of blooms or over fertilization. This may allow for the maximum fixation of carbon within the interior of the bloom. The center of the patch may be regarded as that area which is sufficiently distant from the edge of the patch, so that the variation of the concentration of fertilizer there is due only to the initial concentration and the utilization of the fertilizer by the phytoplankton bloom.

Sequestration of carbon dioxide by fertilizing a suitable area of the surface of an open ocean has a number of benefits. Substantial amounts of carbon dioxide may be sequestered for substantial periods of time. The present invention may sequester all of the net carbon dioxide produced by the burning of fossil fuels because about 53 percent of the carbon taken out of the ocean (and from the atmosphere) by the process of the present invention is expected to be sequestered in the deep ocean for about 1,000 to about 2,000 years, as has been measured in the deep, tropical Pacific Ocean. The present invention should not be carried out in a shallow bay or lake because this could produce anoxic conditions.

The barren ocean may be made verdant by adding the missing nutrients to the ocean surface. This occurs naturally in the upwelling off of Peru where nutrient-rich bottom water comes to the surface and the phytoplankton bloom.

Whether an area of the surface of an ocean is suitable for sequestering carbon dioxide depends on a number of factors. The depth of the ocean should be sufficient to prevent the development of anoxic conditions after fertilization. The depth of the thermocline, about 50 to 300 ft. (about 15 to 91 meters), is preferably less than the depth of the photic zone, such that the thermocline prevents the fertilizer from reaching a depth below the photic zone. The photic zone extends from the surface of the ocean to a depth of from about 150 to 300 feet (about 46 to 91 meters), generally speaking. The photic zone may best be described functionally. It extends from the surface to a depth where sunlight no longer causes an appreciable amount of photosynthesis. However, if the depth of the thermocline is greater than the depth of the photic zone, then the fertilizer may comprise a float material to prevent the fertilizer from sinking to a depth below the photic zone. The amount and nature of the fertilizer depends on the nutrients that are missing from the surface of the ocean. Preferably, iron is the only nutrient that is missing to a significant extent from the area of the ocean to be fertilized. This allows fertilization with a fertilizer that comprises only iron salts, and preferably iron chelates that prevent the iron from precipitating to any significant extent. The preferred chelates include lignin, and particularly lignin acid sulfonate. However, other nutrients may be missing from the surface of the ocean. If nitrogen is missing to a significant extent, then the fertilizer may comprise at least one nutrient which causes bloom of at least one microorganism that fixes nitrogen. The microorganism may be from the group consisting of blue green algae and phytoplankton. The surface of the ocean may also be missing phosphate and trace minerals, which may be incorporated into the fertilizer system. If the surface of the ocean is missing both iron and an additional nutrient, then the preferred method may include the separate application of a plurality of fertilizers. The first fertilizer preferably includes iron, and more preferably an iron chelate. The other missing nutrients may be applied in a second fertilizer, or in a plurality of additional fertilizers. It is preferred that each fertilizer release the corresponding nutrient in a form that does not react with any iron chelates in the first fertilizer and that does not precipitate to any substantial extent.

The amount of carbon dioxide that is sequestered by carrying out a fertilization according to the present invention depends upon a number of factors. The composition, amount and rate of distribution of the fertilizer are all factors. The nutrient content of the water of the ocean is also a factor, not only at the location of the application of the fertilizer, but also all locations to which the fertilized water is subsequently carried by any currents. The temperature, the amount of sunlight and the depth of the thermocline are factors. The nature and number of the organisms in the water that metabolize the fertilizer or that eat the plant materials produced, are also factors.

The primary missing nutrient is iron in much of the surface of the oceans. In an experiment, iron salts were added to a portion of the surface of the barren tropical Pacific ocean. A bloom of phytoplankton resulted. This plant bloom turned the ocean from deep blue to milky green and drew down the carbon dioxide concentration in the fertilized water. The phytoplankton increased about 27 times versus background in about nine days, as a result of fertilization with iron salts during the first, fourth and eighth days (days zero, three and seven of the experiment). This plant bloom occurred in spite of the relatively low efficiency of the fertilizer that was used (about 95 percent of the iron precipitated out of the photic zone shortly after application).

A test has been carried out to evaluate the application of fertilizers that comprise both iron and phosphate. The initial fertilization produced a bloom of phytoplankton of about 4.5 to 7 times the initial concentration of such phytoplankton, in just over one day. Adverse weather and ocean conditions after the first day precluded further effective measurements.

A second test has been carried out to evaluate the application of an iron fertilizer. Iron-containing pellets were dispersed over a nine square mile patch of open ocean. This resulted in an increase of phytoplankton concentration of about five times the background concentration of phytoplankton. The maximum bloom appeared to be about 600 pounds of phytoplankton per pound of fertilizer, by extrapolating over the increasing size of the patch at nearly constant phytoplankton concentration.

The measurement of the amount of carbon dioxide that is sequestered by carrying out the fertilization of the present invention may require that some estimates be made. Total dissolved carbon may be removed from the water at the surface of the ocean by three mechanisms: (1) some will go to the bottom of the ocean as sinking organic particles; (2) some will be dispersed by currents; and (3) some will be degassed to the atmosphere over the ocean. Numerous organisms may metabolize each nutrient including inorganic nitrogen that is available at the surface of the ocean. These organisms may be removed from that area of the surface of the ocean by two mechanisms: (1) some will go to the bottom of the ocean as sinking organic particles; and (2) some are dispersed by the current or swimming. None are removed to the air over the ocean. As these phytoplankton organisms metabolize each fertilizer, they usually uptake both carbon in the form of carbon dioxide and nitrogen in the form of nitrates. Estimates may be made of the amount of organic carbon that sinks to the bottom of the ocean by assuming that the amount of organic carbon that sinks to the bottom of the ocean is proportional to the amount of organic nitrogen that sinks to the bottom of the ocean. The amount of organic nitrogen that sinks to the bottom of the ocean can be measured from the draw down of inorganic nitrates and the carbon-nitrogen ratios in the organic materials formed. As the particles of organic carbon sink below the main thermocline, this organic carbon is effectively sequestered in the deep ocean for periods of time approaching the time scale of organic turnover which is from about 1,000 to about 10,000 years.

The present invention allows for the sequestration of substantial amounts of carbon dioxide. Preliminary calculations indicate that for each year, for each eight square miles of deep tropical ocean fertilized, about 17,000 tons of carbon dioxide containing about 4,600 tons of carbon may be converted to biomass and sequestered to the ocean floor. After a substantial period of time such as over about the next 1,000 to 2,000 years, most of this carbon is expected to be oxidized to carbon dioxide and returned to the surface of the ocean in the form of super-saturated ocean upwellings but a part will remain in the deep ocean in the form of calcium carbonate and other carbonaceous materials. Therefore, the present invention may sequester the 40 percent of the carbon dioxide that the U.S. produces by burning fossil fuels each year and that is not taken out by natural sinks, if this continuous fertilization is carried out over 1,100,000 square miles of deep barren ocean surface. The estimated current cost is about $5 per ton of carbon sequestered, when one considers that about 1,000 tons of carbon will be sequestered per ton of fertilizer spread over the surface of the deep barren ocean. This estimated cost is much lower than the estimated cost of alternative approaches primarily because of the use of sunlight to concentrate the carbon dioxide from the ocean surface and the atmosphere into the form of biomass which is then sequestered naturally over long periods of time.

There are additional consequences of carrying out the method of the present invention. About half the biomass that is created by fertilization according to the present invention will be recycled through zooplankton, fish and marine mammals. If there is continuous fertilization according to the present invention of about 1,100,000 square miles of deep barren ocean, then it is estimated that an additional 70 million tons of catchable fish per year would be produced, or about two-thirds of the current world fish production. This is based on an estimate of 60 tons of catchable fish per square mile per year under continuous fertilization. These estimates may be subject to revision because there are many variables as one moves up the food chain from the phytoplankton. These variables are not particularly well understood or easy to control at this time. However, it is known that where this fertilization occurs naturally, such as off of Peru, the ocean is able to take advantage of the available food and produce a bloom of fish. The amount of catchable fish per year per square mile of barren ocean that is fertilized, may be increased by seeding the ocean with filter-feeder fish. The introduction of these fish will increase the fraction of biological carbon that is recycled to the atmosphere as carbon dioxide, and will decrease the fraction that is sequestered to the ocean depths. Therefore, carbon dioxide sequestration is preferably carried out with fertilization pulses of less than thirty days in a particular body of water, to limit the zooplankton and fish growth. The use of fertilization pulses can increase sequestration of carbon dioxide from as little as ten percent of organic carbon formed to as much as eighty percent organic carbon formed. The length of such a fertilization pulse is more preferably less than about twenty days in a particular area. The time period between fertilization pulses in a particular area is preferably in excess of about thirty days, and more preferably in excess of about forty-five days from the end of one pulse to the beginning of the next pulse.

The environmental effects of carrying out the method of the present invention are expected to be benign, because the same fertilization has been going on naturally in upwellings for millions of years. The main effect of carrying out the method of the present invention is expected to be substantial increases in the food supplies of, and therefore the population of zooplankton and fish in the newly created verdant ecosystems. Preferably, the fertilization according to the present invention will not take place near living coral reefs or in shallow water, so as to avoid any adverse effect thereon. In any event, the environmental effects at the ocean surface of carrying out the present invention will be short term, vanishing within about one month from the cessation of fertilization. If at some time in the future it is decided to carry out such fertilization on a large scale as part of a method of ocean farming, then the carbon dioxide content of the atmosphere may indeed be significantly reduced and, therefore, the possible environmental effects of such large scale ocean farming should be carefully monitored as large scale ocean farming is implemented.

The ocean fertilization of about 1,100,000 square miles (about 3,000,000 square kilometers) at a rate of removing about 2 billion tons (about 1.8 billion metric tons) of carbon dioxide ($CO_2$) would initially require about 700,000 tons (about 644,000 metric tons) per year of fertilizer and would sequester the net annual carbon dioxide production of the United States from burning fossil fuels. This is about 2,000 tons (about 1,800 metric tons) per day for 350 days per year. If the fertilizer applied to the ocean costs about $5000 per ton (about 0.9 metric ton), then the cost is about $3.5 billion per year. This cost includes the cost of monitoring, testing and reporting, so as to optimize the method of sequestration, including the optimization of the composition of the fertilizer, the application rate and the location of application.

Thus, the present method allows for variation, including variation in the composition of the fertilizer, as well as the location and nature of the application of fertilizer, depending on a number of factors.

A method of sequestering carbon dioxide is disclosed by U.S. patent application Ser. No. 09/304,063, which is hereby incorporated by reference. Methods of increasing seafood production in the ocean are disclosed by U.S. Pat. Nos. 5,433,173, 5,535,701, and 5,967,087, which are hereby incorporated by reference.

Variations of the invention may be envisioned by those skilled in the art and the invention is to be limited solely by the claims appended hereto.

I claim:

1. A method of sequestering carbon dioxide in a deep open ocean comprising the following steps:
   (1) testing an area of the surface of a deep open ocean, in order to confirm that at least a first nutrient is missing to a significant extent from said area, and to identify said first missing nutrient; and
   (2) applying in a spiral pattern to said area a first fertilizer which comprises said first missing nutrient, to fertilize said area with an appropriate amount of said first missing nutrient whereby carbon dioxide is sequestered; and
   (3) measuring the amount of sequestered carbon dioxide that results from said fertilization of said area.

2. The method of claim 1, wherein said spiral pattern starts at a buoy that floats with current.

3. The method of claim 2, wherein said first fertilizer comprises an iron chelate, and said chelate comprises lignin acid sulfonate.

4. The method of claim 2, wherein said spiral pattern comprises a plurality of arms.

5. The method of claim 4, wherein said first fertilizer comprises an iron chelate, and wherein said chelate comprises lignin acid sulfonate.

6. The method of claim 4, wherein the concentration of said first fertilizer in said area does not vary by more than about 50% between said arms of said spiral for from about one to about two days after said applying to said arms.

7. The method of claim 1, wherein said testing further comprises a determination of the diffusion coeffecient of said area.

8. The method of claim 1, further comprising the step of limiting zooplankton and fish growth in said area by applying said first fertilizer in pulses.

9. The method of claim 8, wherein the time period between end of the preceding pulse and the start of the following pulse is in excess of about thirty days.

10. The method of claim 9, wherein said area of the surface of said deep open ocean has a thermocline at a depth of less than about 110 meters.

11. The method of claim 1, wherein said testing further comprises testing said area to determine the depth of said open ocean, and wherein said depth is in excess of about 5,000 feet.

12. The method of claim 1, further comprising the following step:
   (4) reporting the amount of sequestered carbon dioxide that results from said fertilization of said area.

13. The method of claim 12, wherein said testing further comprises a determination that in said area the depth of the thermocline is less than the depth of the photic zone.

14. The method of claim 12, wherein said reporting further comprises delivering a report of the amount of sequestered carbon dioxide, wherein said report is fixed in a tangible form selected from printing on a substrate, or data stored in magnetic or optical media.

15. The method of claim 1, wherein said applying is completed over a time period of from about three to about four days.

16. The method of claim 1, wherein said applying forms a patch of fertilizer, and the minimum concentration of said first fertilizer at any point in the surface of said patch is not less than from about 50% to about 60% of the maximum concentration of said first fertilizer at any point in the surface of said patch at a time about three days after the last application of fertilizer.

17. A method of fertilizing an ocean comprising the following step:
   applying in a spiral pattern a first fertilizer to an area of the surface of an ocean.

18. The method of claim 17, wherein said spiral pattern starts at a buoy that floats with current.

19. The method of claim 17, wherein said spiral pattern comprises a plurality of arms, and the concentration of said first fertilizer in said area does not vary by more than about 50% between said arms of said spiral for from about one to about two days after said applying to said arms.

20. A report comprising a statement of the amount of carbon dioxide sequestered by a method of sequestering carbon dioxide in a deep open ocean wherein said method comprises the step of applying in a spiral pattern a first fertilizer to an area of the surface of said ocean.

* * * * *